United States Patent [19]
Grasso et al.

[11] Patent Number: 5,328,542
[45] Date of Patent: Jul. 12, 1994

[54] METHOD OF MANUFACTURING A LAMINATED FUEL CELL COMPONENT WITH AN INTERNAL FLUID IMPERMEABLE BARRIER

[75] Inventors: Albert P. Grasso, Vernon; Robert P. Roche, Cheshire, both of Conn.; Ronald G. Martin, Monson, Mass.

[73] Assignee: International Fuel Cells Corporation, South Windsor, Conn.

[21] Appl. No.: 813,471

[22] Filed: Dec. 26, 1991

[51] Int. Cl.$^5$ .............................................. C09J 7/00
[52] U.S. Cl. .................................... 156/313; 156/90; 156/307.7; 156/309.6; 156/333; 428/307.3; 429/36
[58] Field of Search ..................... 156/313, 333, 309.6, 156/307.7, 90; 428/307.3; 429/36

[56] References Cited

U.S. PATENT DOCUMENTS 3,617,364 11/1971 Jarema et al. .................... 428/307.3
4,938,833 7/1990 Kaufman et al. ................. 156/309.6

Primary Examiner—John J. Gallagher

[57] ABSTRACT

A composite plate-shaped fuel cell component includes two electrically conductive porous plates juxtaposed and in area electrical contact with one another at an interface, and a sealant body accommodated in and completely filling the pores of a sealed region of each of the porous plates that extends to a predetermined distance from the interface into the respective porous plate to form a fluid impermeable barrier between the porous plates and to bond the porous plates to one another at the interface. The sealant body includes at least one layer of a fluoroelastomer sealant that fills all of the pores of at least one of the sealed regions.

2 Claims, 1 Drawing Sheet

METHOD OF MANUFACTURING A LAMINATED FUEL CELL COMPONENT WITH AN INTERNAL FLUID IMPERMEABLE BARRIER

TECHNICAL FIELD

The present invention relates to fuel cell devices in general, and more particularly to a method of manufacturing a laminated fuel cell component with an internal fluid impermeable barrier and to a method of manufacturing such laminated component.

BACKGROUND ART

There are already known various constructions of fuel cell devices, most if not all of which include a multitude of individual fuel cells that are arranged in fuel cell groups or stacks. As is well known, each such fuel cell includes an anode, a cathode, and a quantity of electrolyte or another ion transfer or exchange medium being present at least between (and often also within) the anode and the cathode. Then, as hydrogen (or another gaseous fuel) and oxygen (as such or as an ingredient of air) are supplied to the anode and the cathode, respectively, an electrochemical reaction takes place in each of such individual fuel cells, resulting in the formation of water as the reaction product, with attendant creation of electrical potential difference between the anode and the cathode that is then utilized, ordinarily in conjunction with that created in the other fuel cells, to supply electric power to an external user device or circuit. At least the effective region of each anode and of each cathode has to have a porous structure to allow penetration of at least the gaseous fuel and the oxygen, respectively, therethrough from the respective gaseous medium supply side to the areas at which the usually catalytically promoted electrochemical reaction takes place in the presence of the electrolyte. When arranged in a fuel cell stack, the individual fuel cells are typically separated from one another by respective separator plates that are interposed between the fuel cells and are usually electrically conductive but, to the extent possible, impervious both to liquids and gases.

Experience especially with fuel cell devices employing acid electrolytes has shown that separator plates that have the required degree of fluid, and particularly gas, impermeability are very difficult to make and hence expensive. Moreover, even if such discrete separator plates were less expensive than they currently are, they still constitute additional components Of the fuel cell stack which have to be separately stored, handled and ultimately assembled with the other components into the fuel stack. This further adds to the already considerable cost of the fuel cell stack or device.

To avoid these problems, it has been previously proposed, for instance in the U.S. Pat. No. 4,505,992 to Dettling et al, issued on March 1985, and in the commonly assigned U.S. Pat. No. 4,929,517 issued on May 29, 1990 to Luoma et al, to dispense with such discrete or separator plates, albeit not with their function. As disclosed there, this is achieved by forming a laminated assembly including two porous electrolyte retention plates in area contact with one another all over one major surface of each of them, with a sealant material initially present as a sheet between the two aforementioned major surfaces being forced during the performance of the lamination process to penetrate to a predetermined depth into the pores of both of the porous electrolyte retention plates in such a manner as to ideally completely fill or plug the affected pores and thus prevent fluid flow through such pores between the electrolyte retention plates.

Obviously, the material to be used as the sealant has to be compatible with the environment in which it is being used. This means that it not only must be highly invulnerable to the various gaseous and liquid media with which it may come into contact during the operation of the fuel cell device, such as oxygen, hydrogen, phosphoric acid or the like, that is, not to react therewith or not to be dissolved thereby, but also must be capable of withstanding the temperatures and temperature changes encountered during the lamination process and later during the use of the fuel cell device without suffering damage that would destroy or compromise its function as a fluid impermeable barrier. This drastically limits the choice of such materials.

Up to now, it was believed that only the materials mentioned in the above patents, and more particularly tetrafluoroethylene (TFE), perfluoroalkoxy tetrafluoroethylene (PFA), chlorinated tetrafluoroethylene (CTFE) or fluorinated ethylene propylene (FEP) are capable of satisfying the rigorous demands on the sealant to be used for this purpose. Unfortunately, it has been established that the performance of even these rather high-quality materials leaves much to be desired. In searching for the cause of their less than satisfactory performance, it has been determined that it is attributable, at least in part, to the difference between the coefficient of thermal expansion of the respective one of the above materials and that of the porous electrolyte retention plate (usually graphite or other carbonaceous material or mixture containing such carbonaceous material) which in turn, resulted in high residual internal stresses in the laminated assembly as the latter cooled from the lamination temperature. These residual stresses are so high for all of the above materials that they cause microcracking of the assembly with resultant fluid leakage through the sealant region.

Accordingly, it is a general object of the present invention to avoid the disadvantages of the prior art.

More particularly, it is an object of the present invention to provide a plate-shaped laminated fuel cell assembly including two porous components and an internal fluid impermeable barrier, which assembly does not possess the disadvantages of the known assemblies of this kind.

Still another object of the present invention is to devise a method of providing the laminated assembly of the type here under consideration in such a manner as to assure that the sealant constituting the fluid impermeable barrier penetrates to the desired depth into each of the porous components.

A concomitant object of the present invention is to develop the method of the above kind in such a manner as to be relatively simple and inexpensive to perform and yet to obtain reliable results.

SUMMARY OF THE INVENTION

In keeping with these objects and others which will become apparent hereafter, one feature of the present invention resides in a composite plate-shaped fuel cell component that includes at least two electrically conductive porous plates juxtaposed and in area electrical contact with one another at an interface, and a sealant body accommodated in and completely filling the pores of a sealed region of each of the porous plates that extends to a predetermined distance from the interface into the respective porous plate to form a fluid impermeable barrier between the porous plates and to bond the porous plates to one another at the interface. According to the present invention, the sealant body includes at least one layer of a fluoroelastomer sealant that fills all of the pores of at least one of the sealed regions.

According to another aspect of the present invention, there is provided a method of manufacturing a composite plate-shaped fuel cell component, this method comprising the steps of forming an assembly including at least two electrically conductive porous plates and a sheet-shaped sealant body coextensively sandwiched between the porous plates and including two coextensive layers each of a different sealant material one of which is initially flowable at a relatively low first temperature but eventually solidifies and remains solid at a relatively high second temperature while the other of said sealant materials is substantially solid at said first temperature but becomes flowable at said second temperature, pressing the porous plates toward one another at the first temperature for the one sealant material to be forced by the then solid other solid material to flow into and completely fill and solidify in the pores of a sealed region extending to a predetermined distance into one of said porous plates, and subsequently pressing the porous plates toward one another at said second temperature for the other sealant material to be forced by the then solid one solid material to flow into and completely fill the pores of another sealed region extending to a predetermined distance into the other of the porous plates.

BRIEF DESCRIPTION OF THE DRAWING

The present invention will be described in more detail below with reference to the accompanying sole FIG. of the drawing, which is a somewhat simplified cross-sectional view of a fragment of a fuel cell stack containing a plate-shaped laminated assembly embodying or made in accordance with the present invention.

BEST MODE FOR CARRYING OUT THE INVENTION

Figure 1:
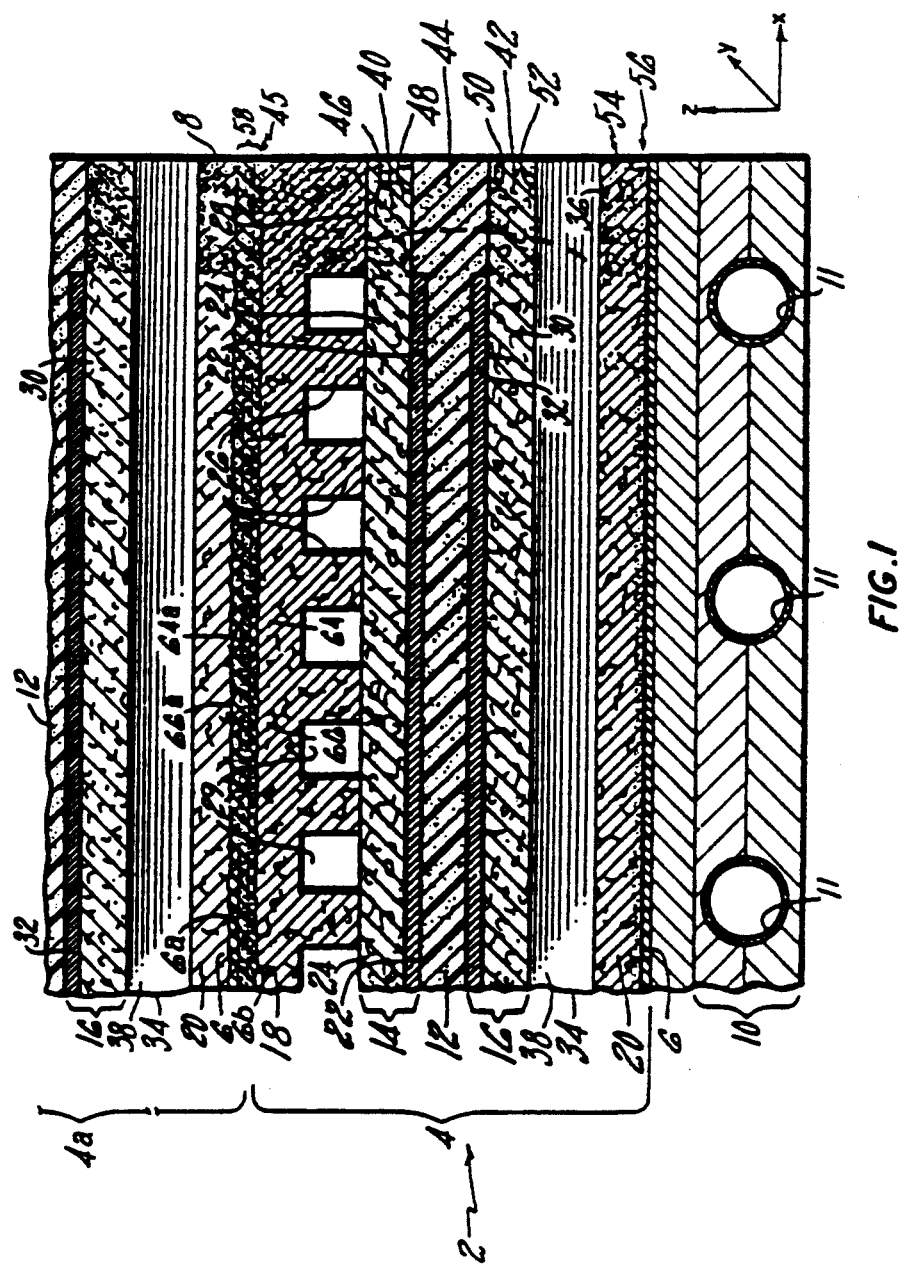

Referring now to the drawing in detail, and first to FIG. 1 thereof, it may be seen that the reference numeral 2 has been used therein to identify a fuel cell stack in its entirety. The stack 2 is shown, and will be described below, as constructed for use in an electrochemical cell assembly such as a fuel cell powerplant employing a liquid electrolyte, especially phosphoric acid.

The fuel cell stack 2 includes a plurality of fuel cells as represented by a fuel cell 4 and a portion of an adjacent cell 4a. Each fuel cell, such as 4 or 4a, is box-like having two planar faces, such as a planar surface 6, and sides or edges, such as four edges represented by the single edge 8. Cooler holders, represented by a single cooler holder 10, are spaced at intervals between sets of fuel cells. The cooler holders 10 are adapted to receive conduits 11 for a coolant.

Each fuel cell 4 or 4a includes an electrolyte retaining matrix 12 disposed between an anode electrode 14 and a cathode electrode 16. An electrolyte reservoir plate 18 is adjacent the anode 14 and an electrolyte reservoir plate 20 is adjacent the cathode 16. The term "plate" is used in its broad sense and includes plates that are curved or flat, and porous or solid.

Each anode electrode 14 has a catalyst layer 22 and an electrode substrate 24 which supports the catalyst layer 22. The substrate 24 is a porous plate and acts as a gas permeable reservoir layer for the electrolyte. The catalyst layer 22 is bonded to the substrate 24 and is formed of catalyst particles bonded together with a hydrophobic material such as polytetrafluoroethylene. One such catalyst is platinum supported on carbon particles.

The porous electrolyte reservoir plate 18 has ribs 26 and an edge portion 28. The ribs 26 are spaced apart leaving passages 29 for fuel therebetween which extend laterally across the plate in the Y-direction to one of the edges 8 (not shown) of the cell 4. A suitable fuel, such as hydrogen, is flowed through the passages 29 and the substrate reservoir layer 24 to the catalyst layer 22.

Electrolyte transfer between the matrix 12 and both the electrolyte reservoir plate 18 and the reservoir layer 24 occurs directly through the pores of the catalyst layer 22 which is partially hydrophilic. The catalyst layer may have holes to aid in this liquid transfer. This distribution of electrolyte within the cell 4 occurs as a result of the capillarity of porous structures (that is, the surface tension phenomenon of the gas-liquid interface) which causes the porous structure to develop capillary forces. The smaller the pore, the larger the capillary force and the greater the liquid retention capability.

The cathode electrode 16, like the anode electrode 14, has a substrate 30 and a catalyst layer 32. The catalyst layer 32 is bonded to the substrate 30. The electrolyte reservoir plate 20 adjacent the cathode 16 has a plurality of ribs, as represented by the single rib 34. The ribs 34 are spaced apart to define passages 38 for the oxidant which extend laterally in the X-direction across the plate to the edge 8 (shown). These passages 38 generally extend perpendicular to the passages 29. An oxidant, such as the oxygen contained in air, is flowed through these passages 29 between the substrate reservoir layer 30 and the electrolyte reservoir plate 20 and from the passages 29 through the substrate to the catalyst layer 32.

Each porous plate having a reservoir layer is formed of relatively small fragments (particles) of a material or materials that are electrically and thermally conductive and are compatible with the environment. Such particles include carbon, graphite, and boron carbide.

Because plates having reservoir layers are porous, each such plate has a peripheral seal region, such as the seal regions which block the loss of gases from passages 29. For example, the anode substrate 24 has a peripheral seal region 40, the cathode substrate 30 has a peripheral seal region 42, and the electrolyte reservoir plates 18 have peripheral seal regions in the edge region 28. In the edge region 28, the seal region extends parallel to the endmost passage of the passages 29. While the edge region of the cathode electrolyte reservoir plate 20 is not shown, the seal region extends parallel to the endmost passage of the passages 34.

Each seal region is filled with a sealing material to adapt the seal region to form a seal with the electrolyte. The sealing material comprises an inert powder selected from the group consisting of carbon, graphite, silicon carbide and mixtures thereof. The powder has a particle size which is less than one micron and a low structure to facilitate dispersal of the powder to the original prime particles to aid in forming a high solid, low viscosity suspension. The sealing material increases the density of the seal region of the substrate thus decreasing the pore size and porosity of the plate.

Thus, substantially all the pores (that is, the pore size distribution) of the edge region are smaller than substantially all the pores (the pore size distribution) in a region spaced away from the edge region, such as the region in the ribs 26. Because the pores of the seal region are smaller than the remainder of the plate, the entire volume of the seal region remains essentially completely filled with electrolyte and no path for gas extends through the seal as long as the pore size of the edge region is smaller than the pore size of the matrix or, if larger, as long as the matrix 12 and edge region are filled with electrolyte. Liquid seals are thereby formed by sandwiching the sealing portions between the edge portions of the upper adjacent structure at 45 and the edge portion of the lower adjacent structure at 54. Thus, these liquid seals extend to the locations 45, 46, 48, 50, and 52.

The capillarity resulting from the surface tension of liquid in porous structures, such as electrolyte in the seal region, causes capillary forces which resist movement of the liquid electrolyte from the pores of the seal region. The smaller the pore, the larger the capillary force at the gas-liquid interface and the larger the ability to resist differences in pressure between any reactant gas and the exterior of the cell. By reason of the method used to fill, the seal formed in the substrate can resist steady state gas pressures and even transient differences in pressure which can range between five and thirty pounds per square inch, absolute (5 and 30 psia).

A seal structure 56 is provided to the cell 4 and the adjacent cooler holder 10 at face 6 and extends laterally in the X-Y directions. A laterally extending seal structure 58 is provided to the adjacent pair of cells 4 and 4a. The seal structure 58 extends through the faces 6a and 6b and is formed in accordance with the present invention at least in part of a sealant material that is a fluoroelastomer (fluorocarbon elastomer) that is accommodated in the pores of at least one of the electrolyte reservoir plates 18 and 20. More particularly, it is advantageous for only the fluoroelastomer to be contained in the pores of both of the electrolyte reservoir plates 18 and 20 throughout the seal structure 58. The fluoroelastomer is advantageously of the type commercially available from the 3M Company under the trademark Fluorel, a fully-saturated fluorinated polymer containing more than 60 weight percent fluorine, especially Fluorel FT 2320 which includes $Ca(OH)_2$ and $MgO$ as curing agents, that of the E.I. Dupont de Nemours Company available under the trademark Viton, a series of fluoroelastomers based on the copolymer of vinylidene fluoride and hexafluoropropylene, and similar products available from the Daikin Company of Japan and the Montecatini Company of Italy.

In any event, other fluoroelastomer materials may also be acceptable, so long as they have a proper balance of (sufficiently low) Mooney viscosity under the laminating conditions and a curing system that allows adequate time to for the sealant material to impregnate the electrolyte reservoir plate pores prior to the occurrence of any significant elastomer crosslinking. An acceptable curing system is one that does not compromise the corrosion resistance of the material of the electrolyte retention plates 18 and 20. Curing agents that leave a residue of solid particles within the elastomer are, generally speaking, to be avoided if such particles corrode in the fuel cell environment, forming voids sufficient to allow leakage of acid electrolyte or gaseous reactants therethrough. Liquid curing agents are usually preferred. An example of the latter type of elastomer is that sold by the 3M Company as L-11358.

It has been established that the use of such materials does not result in the formation of microcracks in the structure of the sealing region or barrier 58, particularly because the residual stresses encountered when such materials are used are much lower than those encountered with the conventionally used materials mentioned before, and well within the range that can be handled by the various materials without damage thereto. Moreover, as desired, a very low electrical resistance is encountered between the electrolyte reservoir plates 18 and 20.

The seal structure 58 extends laterally to the edges 8 of the porous plates 18 and 20 to provide means for blocking the passage of electrolyte and of reactant gases from fuel cell 4 and fuel cell 4a. Thus, the seal structure 58 blocks the leakage of gaseous reactants and electrolyte through the faces 6a and 6b in a direction Z which is generally normal (perpendicular) to the lateral directions X and Y.

The seal structure 58 is formed by juxtaposing the electrolyte reservoir plates 18 and 20 with one another, with a film or sheet of the fluoroelastomer material interposed or sandwiched therebetween, and by then pressing the plates 18 and 20, in a well known manner, toward one another under pressure and temperature conditions that result in the flow of the fluoroelastomer material into the pores of the plates 18 and 20. Such conditions are somewhat different for each of the materials listed above so that they will not be specifically listed here, nor need they be because the properties of such materials are well known.

In an alternative, the seal structure 58 may consist of two different materials present in two different layers, one including basically only the aforementioned fluoroelastomer material contained in the pores of one of the plates 18 and 20 (advantageously on the anode side) and the other only a material of the type disclosed in the above patents filling the pores of the other of the plates 20 and 18 (especially on the cathode side where the environment is more corrosive). When this approach it to be taken, two separate sheets each of one of such materials (or a single two-ply sheet containing two layers each containing a different one of such materials) are sandwiched in a proper orientation between the electrolyte reservoir plates 18 and 20 and the plates 18 and 20 are pressed together under conditions and especially at a temperature at which only the fluoroelastomer material is flowable. At this stage, then, the other material acts as a "piston" that forces the fluoroelastomer material into the pores of the appropriate plate 18 or 20. Subsequently, after the fluoroelastomer material has cured or solidified in such pores, the temperature is raised to a level at which the other material becomes flowable so that further pressing of the plates 18 and 20 toward one another causes the solidified fluoroelastomer material to act as a "piston" forcing the other sealant material into the pores of the respective other plate 20 or 18.

This latter concept of the present invention can also be used for making an impervious separator plate out of a porous plate, such as that available under the trademark Toray. In this case, the two-ply sheet is pressed, with the fluoroelastomer or similar material, such as gum rubber preferably devoid of curing agents, facing the porous plate, against the latter under such pressure and temperature conditions that not only the fluoroelastomer or similar material but eventually also the other material is forced into the pores of the affected sealing region, plugging the pores to a certain depth and thus preventing the preferably uncured fluoroelastomer or similar material from escaping from the interior of the plate. The fluoroelastomer or similar material is thus "bottled in" in the plate and the plate becomes fluid impermeable as a result. This procedure can take place either during the lamination of an assembly containing, in addition to the separator plate, the two electrolyte reservoir plates such as 18 and 20 (in which case at some of the other material may penetrate into the pores of the respective plates 18 and 29 at the respective interfaces, or it can be used for the manufacture of a discrete separator plate.

While the present invention has been illustrated and described as embodied in a particular construction of a fuel cell device or stack, it will be appreciated that the present invention is not limited to this particular example; rather, the scope of protection of the present invention is to be determined solely from the attached claims.

We claim:

1. A method of manufacturing a composite plate-shaped fuel cell component, comprising the steps of:

forming an assembly including at least two electrically conductive porous plates and a sheet-shaped sealant body coextensively sandwiched between said porous plates and including two coextensive layers each of a different sealant material one of which is initially flowable at a relatively low first temperature but eventually solidifies as an elastomer and thereafter remains solid even when heated to a relatively high second temperature, while the other of sad sealant materials is substantially solid at said first temperature but becomes flowable at said second temperature, wherein at least one of said sealant materials is a fluoroelastomer;

pressing said porous plates toward one another initially at said first temperature so that the other sealant material, being solid at said first temperature, causes the one sealant material to flow into and completely fill and solidify in the pores of a sealed region extending to a predetermined distance into one of said porous plates; and subsequently pressing said porous plates toward one another at said second temperature so that the one sealant material, having solidified by then, causes the other sealant material that is flowable at said second temperature to flow into and completely fill the pores of another sealed region extending to a predetermined distance into the other of said porous plates.

2. The method as defined in claim 1, wherein said fluoroelastomer is a fully-saturated fluorinated polymer containing more than 60 weight percent fluorine.

* * * * *